United States Patent [19]

Matsuura

[11] Patent Number: 5,333,583
[45] Date of Patent: Aug. 2, 1994

[54] FUEL INJECTION CONTROL METHOD AND A CONTROL APPARATUS FOR A CYLINDER DIRECT-INJECTION ENGINE

[75] Inventor: Takashi Matsuura, Tokyo, Japan

[73] Assignee: Fuji Jukogyo Kabushiki Kaisha, Tokyo, Japan

[21] Appl. No.: 124,646

[22] Filed: Sep. 22, 1993

[30] Foreign Application Priority Data

Oct. 8, 1992 [JP] Japan .................. 4-298030

[51] Int. Cl.⁵ .................. F02B 17/00; F02D 41/34
[52] U.S. Cl. .................. 123/295; 123/305; 123/73 C; 123/478
[58] Field of Search .................. 123/73 C, 276, 295, 123/301, 305, 478

[56] References Cited

U.S. PATENT DOCUMENTS

| | | | |
|---|---|---|---|
| 5,050,551 | 9/1991 | Morikawa | 123/305 |
| 5,054,444 | 10/1991 | Morikawa | 123/295 |
| 5,078,107 | 1/1992 | Morikawa | 123/295 |
| 5,086,737 | 2/1992 | Watanabe et al. | 123/295 |
| 5,127,378 | 7/1992 | Ito | 123/305 X |
| 5,191,531 | 3/1993 | Kurosu et al. | 123/478 X |

*Primary Examiner*—Willis R. Wolfe
*Attorney, Agent, or Firm*—Beveridge, DeGrandi, Weilacher & Young

[57] ABSTRACT

For fuel injection control in a cylinder direct-injection engine, fuel injection beginnings for injecting fuel successively into a plurality of cylinders are calculated; threshold voltage impression beginnings at which a threshold voltage for starting to inject the fuel from injectors is applied are calculated, corresponding to the fuel injection beginnings, and the ends of the threshold voltage impression are calculated; it is determined whether or not a first period between the beginning and end of threshold voltage impression for a preceding cylinder is coincident with a second period between the beginning and end of threshold voltage impression for a succeeding cylinder; and the second period is modified so as to be earlier or later than the first period, if the two periods are coincident with each other.

14 Claims, 5 Drawing Sheets

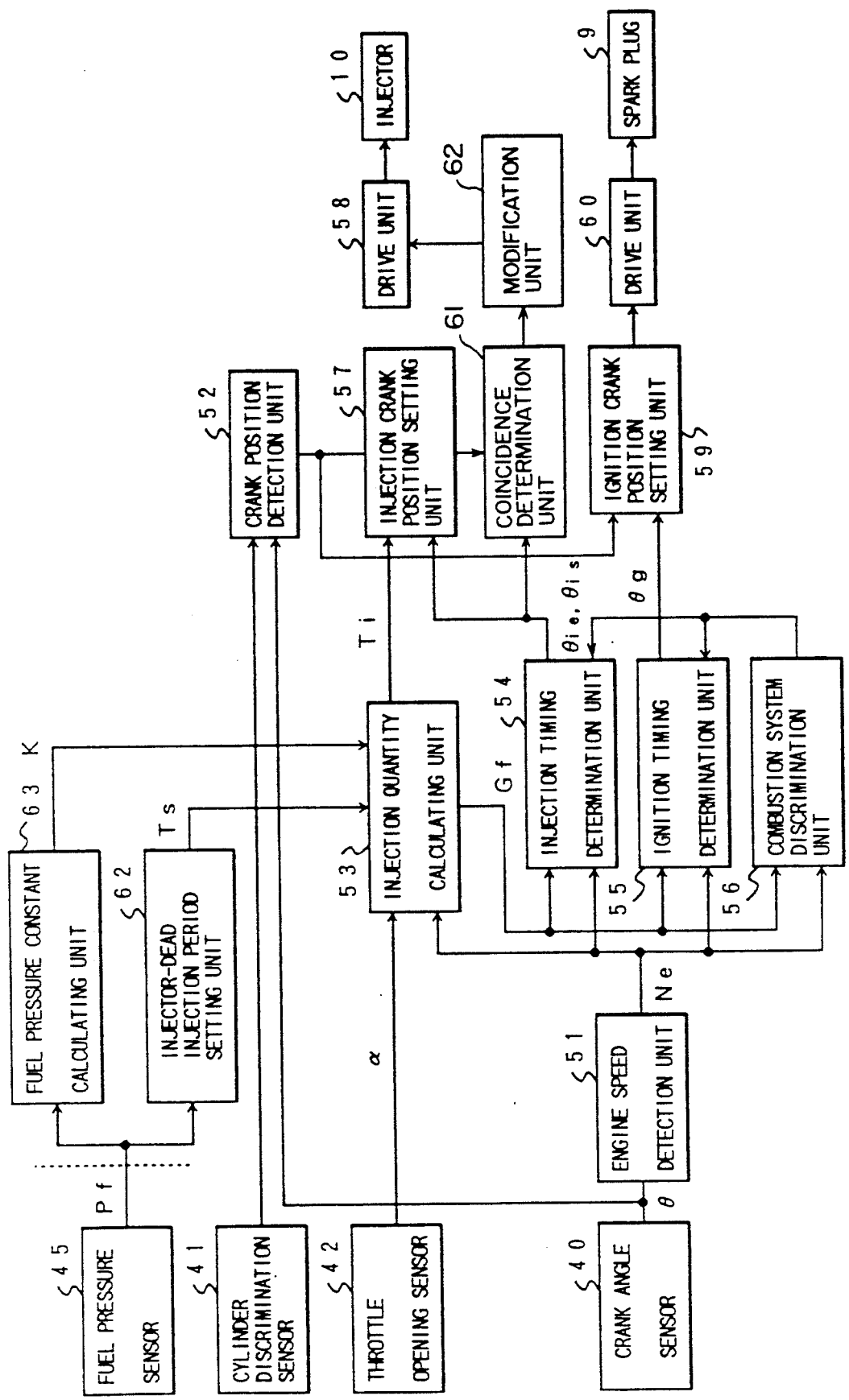
F I G. 3

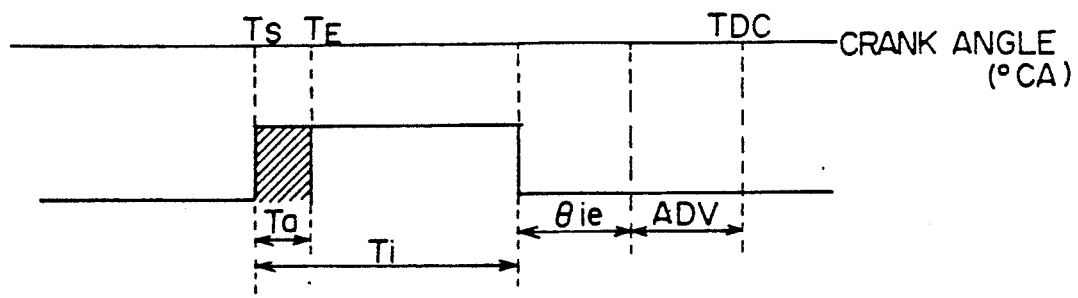
F I G. 4
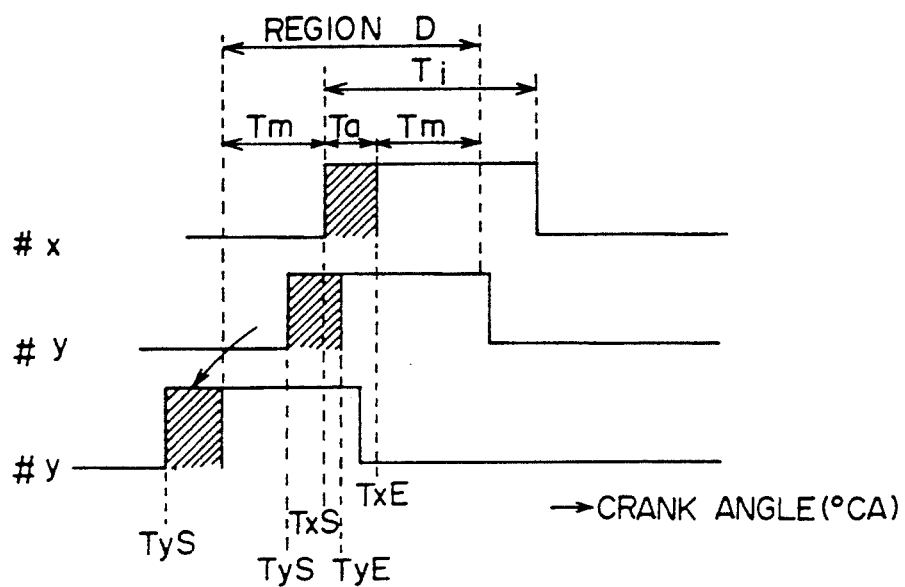
F I G. 5
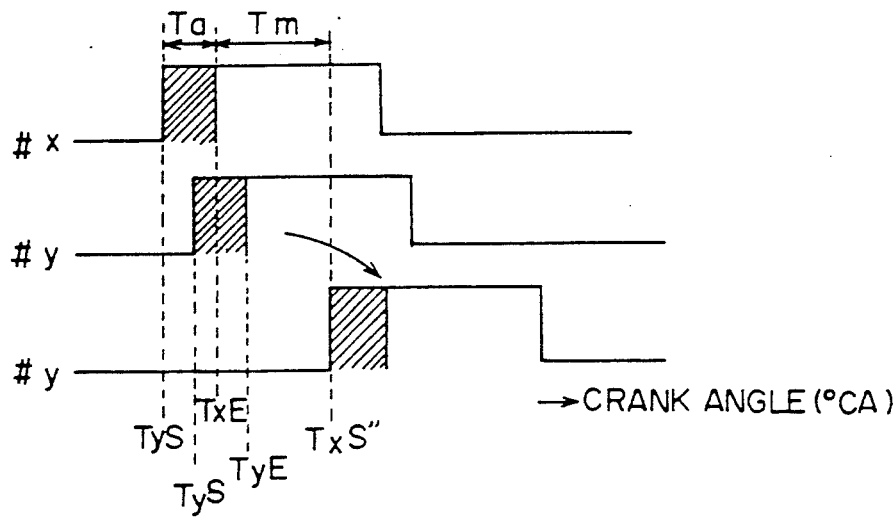
F I G. 6

FUEL INJECTION CONTROL METHOD AND A CONTROL APPARATUS FOR A CYLINDER DIRECT-INJECTION ENGINE

BACKGROUND OF THE INVENTION

1. Field of the Invention

The present invention relates to a fuel injection method and apparatus for a cylinder direct-injection engine, and more paticularly, to a measure to counter the coincidence of fuel injection timings for a plurality of cylinders during combustion mode switching operation.

2. Information of the Related Art

In a cylinder direct-injection engine for a vehicle, an injector is mounted in a combustion chamber, and a fuel under high pressure is directly injected from the injector into a cylinder in a compression stroke, which starts when a scavenging port is closed and terminates when ignition starts. Combustion in the cylinder has two modes i.e., stratified combustion and homogeneous combustion. The stratified combustion is effected with a relatively late fuel injection timing during idling operation or low- or medium-load operation, while the homogeneous combustion is effected with a relatively early fuel injection timing during high-load operation. When the load is changed from low or medium load to high load, or contrariwise, therefore, the combustion mode is switched from the stratified combustion to the homogeneous combustion, or in the opposite way.

When the combustion mode is switched in this manner, the fuel injection timing is changed. The following is a description of the way the injection timing is changed as the combustion mode is switched, in a two-cycle four-cylinder engine with a firing order of a second cylinder (#2), a first cylinder (#1), a fourth cylinder (#4) and a combustion mode is switched from the stratified combustion to the homogeneous combustion when combustion is being started in a first cylinder (#1) after the stratified combustion is executed in a second cylinder (#2). In this case, the fuel injection timing for the second cylinder is relatively late, since the stratified combustion is executed in this cylinder (#2). For the first cylinder, on the other hand, the fuel injection timing is relatively early, since the homogeneous combustion is executed in this cylinder (#2). Accordingly, the injection timing for the second cylinder may coincide with the injection timing for the first cylinder.

Meanwhile, a pulse for the fuel injection timing is generated and applied to the injector. A threshold voltage higher than the normal voltage of the power supply is applied during a first threshold voltage impression period (e.g. 200 μs) for this injection pulse. As a result, initiation of fuel injection by means of the injector is accelerated.

Thus, if the fuel injection timing for one cylinder is coincident with that for another cylinder, and then the first threshold voltage impression period for one injection pulse is coincident with that for the other cylinder, electric load increases considerably. In consequence, the voltage drops, and the performance characteristic of the injector and the injection quantity are lowered or reduced.

This situation may be eliminated by increasing the capacity of the power supply. Since the coincidence of the fuel injection timings is very rare, however, the increase of the supply capacity inevitably entails an increase in cost.

A measure to counter such coincidence of the fuel injection timings is described in Japanese Patent Laid-Open No. 63-212741 (1988). Fuel injection is effected in synchronism with the engine speed during a normal operation, and out of synchronism during acceleration. If asynchronous fuel injection is required during synchronous fuel injection, the timings for these injection operations may possibly coincide with each other. Usually, in this case, the coincidence is avoided by putting off the latter injection.

In the system disclosed in this publication, however, the fuel injection timing is changed in or out of synchronism with the engine speed. Thus, this system is quite different from a system in which the fuel injection timing is changed depending on the combustion mode, stratified or homogeneous. In the disclosed system, moreover, the latter injection is always deferred if the fuel injection timings are coincident, so that the injection is inevitably delayed by a large margin.

SUMMARY OF THE INVENTION

The object of the present invention is to provide a fuel injection method and apparatus for a cylinder direct-injection engine, in which the fuel injection timing for one cylinder is prevented from coinciding with that for another cylinder as far as possible, thereby minimizing a lowering of the combustion efficiency, which is attributable to a change of the fuel injection timing, when the injection timing is changed depending on the combustion mode, stratified or homogeneous.

According to the present invention, there is provided a fuel injection control method for a cylinder direct-injection engine which includes a plurality of cylinders and a plurality of injectors for directly injecting fuel into the cylinders, the method comprising the steps of: calculating beginnings of fuel injection for injecting the fuel into the cylinders; calculating beginnings of threshold voltage impression at which a threshold voltage for starting to inject the fuel from the injectors is applied, corresponding to the fuel injection beginnings, and calculating the ends of the threshold voltage impression; determining whether or not a first period between the beginning and end of threshold voltage impression for a preceding cylinder is coincident with a second period between the beginning and end of threshold voltage impression for a succeeding cylinder; and modifying the second period so as to be earlier or later than the first period, if the two periods are coincident with each other.

When the fuel injection timing is changed, depending on the combustion mode, stratified or homogeneous, it is determined whether or not the period between the beginning and end of threshold voltage impression for the succeeding cylinder is coincident with the period between the beginning and end of threshold voltage impression for the preceding cylinder. If the two periods are coincident with each other, the period between the beginning and end of threshold voltage impression for the succeeding cylinder is modified so as to be earlier or later than the period between the beginning and end of threshold voltage impression for the preceding cylinder.

By doing this, electric load can be prevented from greatly increasing during combustion mode switching operation. As a result, a voltage drop is prevented, and a lowering of the combustion efficiency, which may be caused by the change of the injection timing, is minimized. Thus, the method of the invention can ensure a satisfactory performance characteristic and an improved combustion mode switching characteristic.

Since the period between the beginning and end of the threshold voltage impression requires only a relatively minor modification, moreover, fluctuations of the engine output and the like can be restricted to low degrees during the combustion mode switching operation. Furthermore, this control is relatively easy, and the coincidence of the threshold voltage impression periods can be securely prevented to ensure the minimum injection period.

BRIEF DESCRIPTION OF THE DRAWINGS

FIG. 3 is a block diagram of the control apparatus according to the embodiment;

FIG. 4 is a diagram for illustrating a fuel injection beginning position, threshold voltage impression beginning crank position, etc.;

FIG. 5 is a diagram for illustrating a modified state of an injection crank position, in the case where a threshold voltage impression beginning for a succeeding cylinder precedes a threshold voltage impression beginning for a preceding cylinder;

FIG. 6 is a diagram for illustrating a modified state of the injection crank position in the case where the threshold voltage impression beginning for the succeeding cylinder is preceded by threshold voltage impression beginning for the preceding cylinder.

DETAILED DESCRIPTION OF THE PREFERRED EMBODIMENT

A preferred embodiment of the present invention will become understood from the following detailed description referring to the accompanying drawings.

Figure 1:
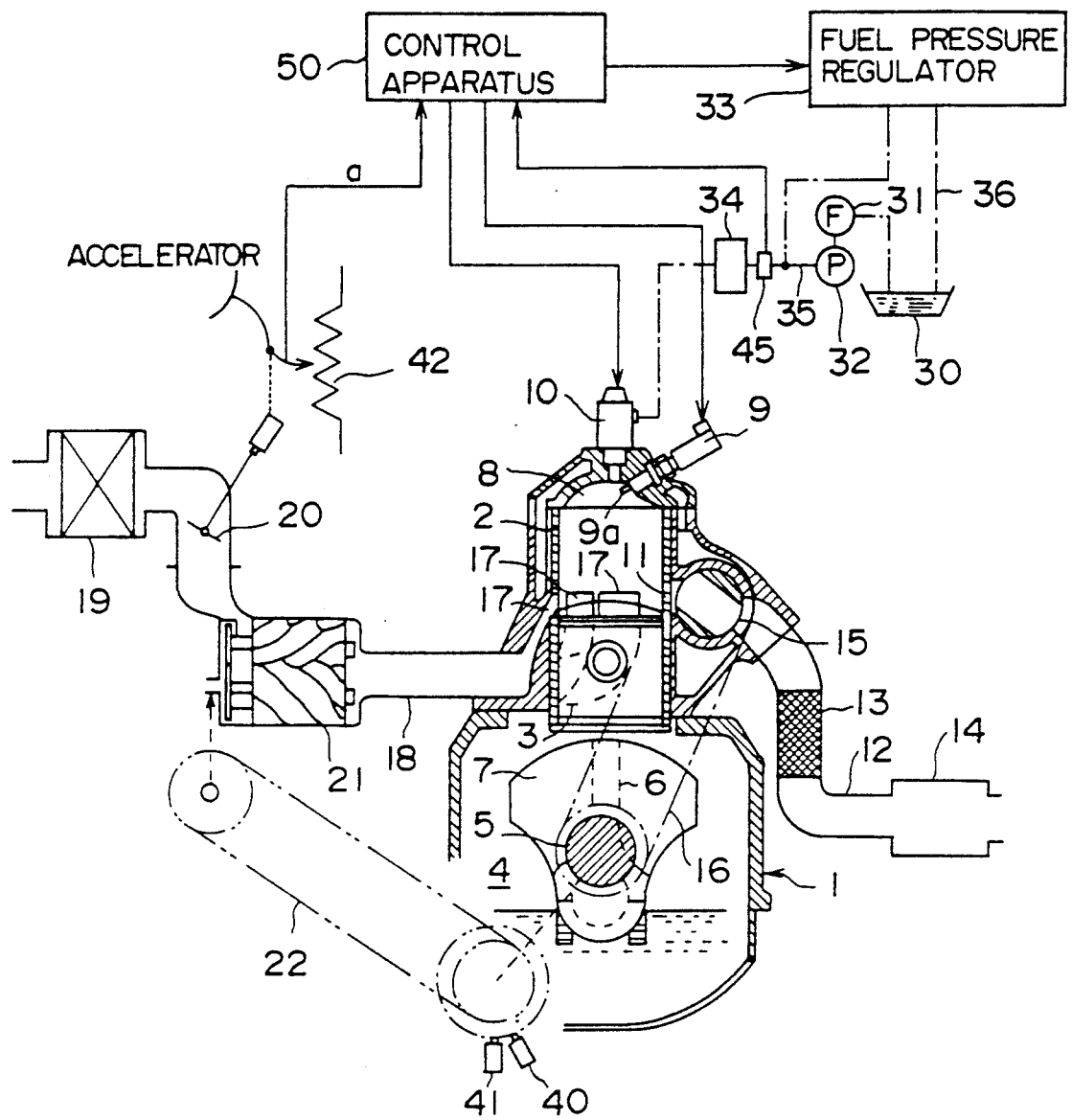
FIG. 1 is a diagram schematically showing a cylinder direct-injection engine according to the present invention.

Referring first to FIG. 1, there will be described a two-cycle cylinder direct-injection gasoline engine. A piston 3 is inserted for reciprocation in a cylinder 2 of the two-cycle engine body 1. The piston 3 is connected to a crankshaft 5 in a crank chamber 4 by an eccentric connecting rod 6. The crankshaft 5 is provided with a balancer 7 which serves to cancel the inertia force of reciprocation. A combustion chamber 8 may be in any of various shapes, e.g., an offset or wedged shape. A high-pressure one-fluid injector 10 is located in a high position near the center top portion of the chamber 8. The injector 10 opens only during the period of time (pulse width) when a pulse signal is received. A spark plug 9 is inclined so that its electrode 9a is situated right under the injector 10 with respect to the injection direction.

The distance between the injector 10 and the electrode 9a is set in consideration of a conic fuel mist injected under low or medium load immediately before ignition. If this distance is too short, atomization is unsatisfactory. If the distance is too long, the fuel mist spreads. Thus, the distance is set at a moderate value. The electrode 9a is lit up sparks behind the mist, so that stratified combustion can be effected. Since the injector 10 is situated substantially on the center line of the cylinder 2, moreover, a large quantity of fuel injected under high load in an early stage of a compression stroke is quickly diffused through all the area from the center of the interior of the cylinder 2, and is premixed uniformly. Thus, homogeneous combustion can be effected.

An exhaust port 11 opens in the cylinder 2 so as to be closed with a predetermined timing by the piston 3. A catalyzer unit 13 and a muffler 14 are arranged in an exhaust pipe 12 which extends from the port 11. A rotary exhaust valve 15 is attached to the port 11. The valve 15 is rotated by a belt 16 which is wound around the crankshaft 5, whereby the port 11 is opened or closed. When the piston 3 starts to ascend from the bottom dead center side, the exhaust port 11 is closed earlier by the exhaust valve 15 than that by the piston 3. Thus, the timing for fuel injection can be adjusted to an earlier point of time in a high-load homogeneous combustion mode.

A scavenging port 17 opens in a position deviated at 90° to 180° in the circumferential direction from the exhaust port 11. The port 17 is opened or closed with a predetermined timing by means of the piston 3. A suction pipe 18 extends from the port 17, and is provided with an air cleaner 19 and a throttle valve 20, which opens corresponding to the accelerator opening. A scavenging pump 21 is located at the downstream of the valve 20. The pump 21 is continually driven by belt means 22 which is wound around the crankshaft 5, whereby a scavenging pressure is produced at all times. A play is provided so that the valve 20 slightly opens to allow scavenging by means of the scavenging pump 21. If the opening of the throttle valve 20 exceeds the range of this play, the valve 20 opens or closes depending on the accelerator opening, thereby controlling the air flow. A scavenging action is forced by the scavenging pressure based on air only, and air is supplied with a high filling efficiency.

The injector 10 is connected to a fuel tank 30 by means of a fuel passage 35, which is provided with a filter 31, fuel pump 32, fuel pressure regulator 33, and accumulator 34. A return passage 36 extends from the regulator 33, and is connected to the tank 30. The fuel pressure regulator 33 controls the fuel pressure in the injector 10 by adjusting the return of a high-pressure fuel from the fuel pump 32. The fuel pressure is low when the load is low and the air fill is small, and vice versa. A fuel pressure sensor 45 detects the fuel pressure in the fuel passage 35.

Figure 2:
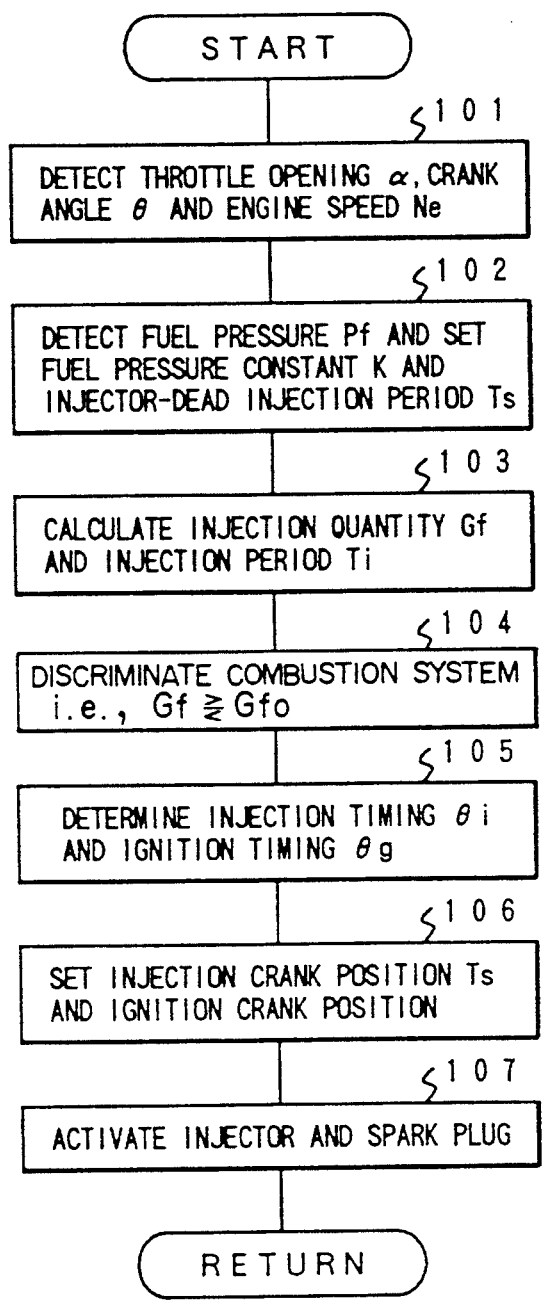
FIG. 2 is a flow chart showing the general operation of a control apparatus according to the embodiment.

Referring now to FIGS. 2 and 3, there will be described a flow and blocks of a control apparatus according to the present embodiment.

In Step 101, a crank angle $\theta$, cylinder to be fired, and accelerator opening $\alpha$ are detected by means of a crank angle sensor 40, cylinder sensor 41, and accelerator opening sensor 42, respectively. A signal for the crank angle $\theta$ is applied to an engine speed detection unit 51, whereupon an engine speed Ne is detected. Also, the signal for the crank angle $\theta$ and a signal from the cylinder sensor 41 are applied to a crank position detection unit 52. Thus, if the cylinders are fired in the order of a third cylinder (#3), a second cylinder (#2), a first cylinder (#1) and a fourth cylinder (#4), for example, the cylinder to be fired is discriminated according to this firing order, and a reference position of the cylinder, before the top dead center, and the like are detected.

In Step 102, a fuel pressure Pf is detected by means of the fuel pressure sensor 45, and is applied to a fuel pressure constant calculating unit 63 and an injector-dead injection period setting unit 62. A fuel pressure constant K and an injector-dead injection period Ts are set with reference to a lattice table which is previously set for the fuel pressure Pf.

In Step 103, signals for the engine speed Ne and the accelerator opening α are applied to an injection quantity calculating unit 53. A basic injection quantity Gf responsive to the operating conditions is retrieved in accordance with a map for the basic injection quantity Gf, which is set corresponding to the engine speed Ne and the accelerator opening α.

Then, a fuel injection period (pulse width) Ti is calculated in accordance with the basic injection quantity Gf, fuel pressure constant K, and injector-dead injection period Ts as follows:

$$Ti = K \cdot Gf + Ts.$$

In Step 104, the signal for the engine speed Ne and a signal for the basic injection quantity Gf are applied to an injection timing determination unit 54, an ignition timing determination unit 55, and a combustion mode discrimination unit 56. In the discrimination unit 56, a point of switching between stratified and homogeneous combustion modes is previously set in accordance with an Ne-Gf map. A set injection quantity value Gfo and the basic injection quantity Gf for this switching point are compared. The combustion mode is regarded as the stratified combustion mode in the case of Gf<Gfo under low or medium load, and as the homogeneous combustion mode in the case of Gf≧Gfo under high load. A discrimination signal for this combustion mode is applied to the injection timing determination unit 54 and the ignition timing determination unit 55.

In Step 105, the injection timing determination unit 54 has a map for the fuel injection timing corresponding to the engine speed Ne and the basic injection quantity Gf. Based on this map, a period θie between the injection end and ignition, and an injection beginning θis are retrieved in the stratified and homogeneous combustion modes, respectively. The period θie is calculated in the stratified combustion, since the injection must be finished immediately before the ignition with a predetermined atomization time left. On the other hand, the injection beginning θis is calculated in the homogeneous combustion, since the injection must be started in an early stage after the exhaust port is closed.

The ignition timing determination unit 55 also has a map for an ignition timing θq corresponding to the engine speed Ne and the basic injection quantity Gf. Based on this map, the ignition timing θg is retrieved for each combustion mode. Thus, the stratified combustion is effected under low or medium load, and the homogeneous combustion under high load.

In the stratified combustion, signals for the fuel injection period Ti and the period θie between the injection end and ignition are applied to an injection crank position setting unit 57, in Step 106. An injection beginning crank position TS, before the top dead center, is calculated in accordance with the injection period Ti, the period θie, and an ignition timing ADV as follows:

$$TS = (Ti + \theta ie)/n + ADV,$$

where n is a period of time per one degree angle of the crank angle at a certain engine speed. Further, the fuel injection period Ti is converted into a signal based on a crank-angle reference position.

In the homogeneous combustion, on the other hand, the signals for the fuel injection period Ti and the injection beginning θis are applied to the injection crank position setting unit 57. The injection beginning crank position TS is calculated directly in accordance with the timing θis.

In Step 107, the signals for the injection beginning crank position TS and the like are applied to a drive unit 58. Then, a driving signal is delivered to the injector 10, whereupon the injector 10 is actuated.

A signal for the ignition timing θq is applied to an ignition crank position setting unit 59, and ignition signals for the dwell period and the like corresponding to the ignition timing θq are calculated in accordance with the crank-angle reference position. These ignition signals are applied to a drive unit 60, whereupon the spark plug 9 is actuated.

The following is a description, referring to FIGS. 3 to 7, of control for preventing the coincidence of threshold voltage impression timings during the combustion mode switching operation. In the description to follow, each timing is converted into a crank position for ease of illustration. In the description of the firing order, symbols x and y are used to designated a preceding cylinder and a succeeding cylinder, respectively.

First, in order to prevent the coincidence, the control apparatus is provided with a coincidence determination unit 61 and a modification unit 62, as shown in FIG. 3. The unit 61 calculates the beginning of threshold voltage impression at which a threshold voltage is applied to start the injector operation; calculates the end of the threshold voltage impression; determines whether or not a second period between the beginning and end of threshold voltage impression for the succeeding cylinder is coincident with a first period between the beginning and end of threshold voltage impression for the preceding cylinder; and modifies the beginning-to-end second period for the succeeding cylinder so as to be earlier or later than the beginning-to-end first period for the preceding cylinder when the two periods are coincident with each other.

Figure 7:
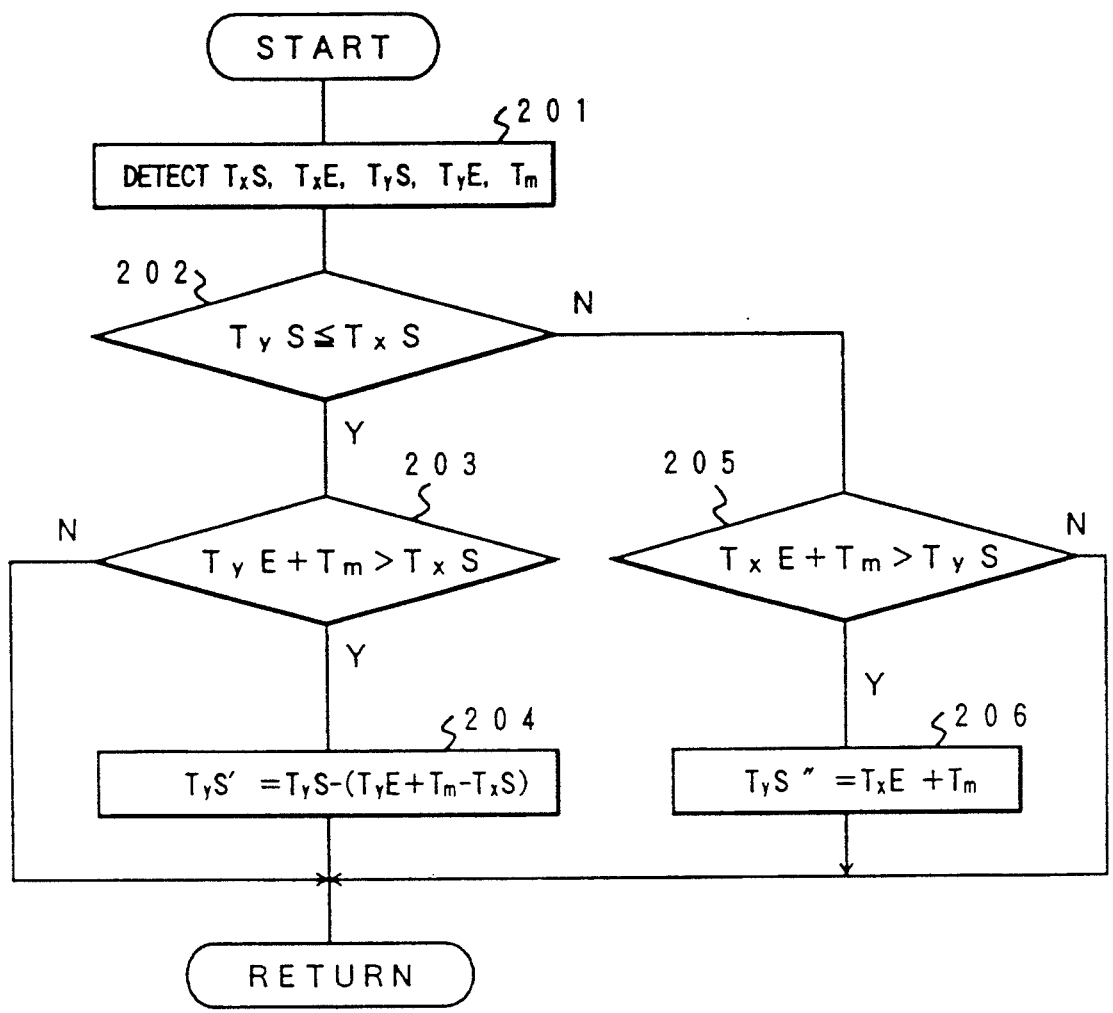
FIG. 7 is a flow chart showing the operation of a coincidence discrimination/modification unit according to the embodiment.

As shown in FIG. 7, the following crank positions are obtained in Step 201. The injection beginning crank position TS corresponds to the threshold voltage impression beginning, as shown in FIG. 4. A threshold voltage impression end TE is obtained by adding a threshold voltage impression period Ta to the threshold voltage impression beginning TS. In FIG. 7, TxS, TxE, TyS and TyE indicate the threshold voltage impression beginning for the preceding cylinder, impression end for the preceding cylinder, impression beginning for the succeeding cylinder, and impression end for the succeeding cylinder, respectively.

A power source is designed so that the threshold voltage can be supplied when injection is made at regular intervals by the injector during the highest speed operation of the engine. Each of these regular intervals is referred to as minimum injection time interval Tm. If this interval Tm is made shorter, the output voltage lowers. The minimum injection time interval Tm is converted into a crank position by means of the engine speed Ne. In the present embodiment, it is determined whether or not the period between the beginning TyS and end TyE of threshold voltage impression for the succeeding cylinder y is coincident with a period or region D obtained by adding the minimum injection time interval Tm to the period between the beginning TxS and end TxE of threshold voltage impression for the preceding cylinder x.

Step 202, it is determined whether or not TyS≦TxS holds. If the result of decision in Step 202 is YES, it is determined in Step 203 whether or not TyE+Tm>TxS holds. If the result of decision in Step 203 is YES, it is concluded that the injection for the succeeding cylinder y precedes the injection for the preceding cylinder x, and that the threshold voltage impression period Ta is coincident with the region D, as shown in FIG. 5.

In this case, the injection beginning position (or threshold voltage impression beginning position) TyS for the succeeding cylinder y is shifted to a point before the aforesaid region D in Step 204, as shown in FIG. 5. A new injection beginning position (or threshold voltage impression beginning position) TyS' is adjusted to $$TyS' = TyS - (TyE + Tm - TxS).$$

If it is concluded, in Step 202, that TyS≦TxS does not hold, it is determined, in Step 205, whether or not TxE+Tm>TyS holds. If the result of decision in Step 205 is YES, it is concluded that the injection for the succeeding cylinder y is preceded by the injection for the preceding cylinder x, and that the threshold voltage impression period Ta is coincident with the region D, as shown in FIG. 6.

In this case, the injection beginning position (or threshold voltage impression beginning position) TyS for the succeeding cylinder (y) is shifted to a point behind the aforementioned region D in Step 206. A new injection beginning position (or threshold voltage impression beginning position) TyS" is adjusted to $$TyS'' = TxE + Tm.$$

If the threshold voltage impression period Ta is coincident when the combustion mode is switched, the threshold voltage is applied in accordance with the aforesaid new threshold voltage impression beginning positions TyS' and TyS", whereupon the fuel is injected from the injector 10.

According to the present invention electric load can be prevented from greatly increasing during combustion mode switching operation. As a result, a voltage drop is prevented, and a lowering of the combustion efficiency, which may be caused by the change of the injection timing, is minimized. Thus, the method of the invention can ensure a satisfactory performance characteristic and an improved combustion mode switching characteristic.

Since the period between the beginning and end of the threshold voltage impression requires only a relatively minor modification, moreover, fluctuations of the engine output can be restricted to low degrees during the combustion mode switching operation. Furthermore, this control is relatively easy, and the coincidence of the threshold voltage impression periods can be securely prevented to ensure the minimum injection period.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A fuel injection control method for a cylinder direct-injection engine which includes a plurality of cylinders and a plurality of injectors for directly injecting fuel into the cylinders, said method comprising the steps of:

calculating beginnings of fuel injection for injecting the fuel into the cylinders;

calculating the beginnings of threshold voltage impression at which a threshold voltage for starting to inject the fuel from the injectors is applied, corresponding to the fuel injection beginnings, and calculating the ends of the threshold voltage impression;

determining whether or not a first period between the beginning and end of threshold voltage impression for a preceding cylinder is coincident with a second period between the beginning and end of threshold voltage impression for a succeeding cylinder; and modifying the second period so as to be earlier or later than the first period, if the two periods are coincident with each other.

2. The fuel injection control method according to claim 1, wherein said coincidence determination step includes the steps of:

calculating a minimum time interval for a power source to supply the threshold voltage;

determining whether or not the second period is coincident with a period obtained by adding the minimum time interval to the first period, and said modification step includes the step of:

shifting the second period to a term before or after the period obtained by adding the minimum time interval to the first period, if the first and second periods are coincident with each other.

3. The fuel injection control method according to claim 2, wherein:

said coincidence determination step includes the step of determining whether or not TyS<TxS holds, where TyS and TxS are the threshold voltage impression beginning for the succeeding cylinder and the threshold voltage impression beginning for the preceding cylinder, respectively.

4. The fuel injection control method according to claim 3, wherein:

said coincidence determination step includes the step of determining whether or not TyE+Tm>TxS holds if it is concluded that TyS≦TxS holds, where TyE and Tm are the threshold voltage impression end for the succeeding cylinder and the minimum time interval for the power source, respectively.

5. The fuel injection control method according to claim 4, wherein:

said modification step includes the step of adjusting TyS' to
$TyS' = TyS - (TyE + Tm - TxS)$ if it is concluded that $TyE+Tm>TxS$ holds, where $TyS'$ is a new shifted threshold voltage impression beginning for the succeeding cylinder.

6. The fuel injection control method according to claim 3, wherein:
   said coincidence determination step includes the step of determining whether or not $$TxE+Tm>TyS$$

holds if it is concluded that $TyS \leq TxS$ does not hold, where $TyE$ is the threshold voltage impression end for the succeeding cylinder.

7. The fuel injection control method according to claim 6, wherein:
   said modification step includes the step of adjusting $TyS''$ to $$TyS''=TxE+Tm$$

if it is concluded that $TxE+Tm>TyS$ holds, where $TyS''$ is a new shifted threshold voltage impression beginning for the succeeding cylinder.

8. A fuel injection control apparatus for a cylinder direct-injection engine which includes a plurality of cylinders and a plurality of injectors for directly injecting fuel into the cylinders, an improvement of the apparatus comprising:
   fuel injection timing calculating means for calculating beginnings of fuel injection for injecting the fuel into the cylinders;
   voltage impression timing calculating means for calculating the beginnings of threshold voltage impression at which a threshold voltage for starting to inject the fuel from the injectors is applied, corresponding to the fuel injection beginnings, and for calculating the ends of the threshold voltage impression;
   coincidence determination means for determining whether or not a first period between the beginning and end of threshold voltage impression for a preceding cylinder is coincident with a second period between the beginning and end of threshold voltage impression for a succeeding cylinder; and
   modification means for modifying the second period so as to be earlier or later than the first period between, if the two periods are coincident with each other.

9. The fuel injection control apparatus according to claim 8, wherein said coincidence determination means includes:
   means for calculating a minimum time interval for a power source to supply the threshold voltage; and
   means for determining whether or not the second period is coincident with a period obtained by adding the minimum time interval to the first period, and said modification means includes:
   means for shifting the second period to a term before or after the period obtained by adding the minimum time interval to the first period, if the first and second periods are coincident with each other.

10. The fuel injection control method according to claim 9, wherein:
    said coincidence determination means includes means for determining whether or not $$TyS \leq TxS$$

holds, where $TyS$ and $TxS$ are the threshold voltage impression beginning for the succeeding cylinder and the threshold voltage impression beginning for the preceding cylinder, respectively.

11. The fuel injection control method according to claim 10, wherein:
    said coincidence determination means includes means for determining whether or not $$TuE+Tm>TxS$$

holds if it is concluded that $TyS>TxS$ holds, where $TyE$ and $Tm$ are the threshold voltage impression end for the succeeding cylinder and the minimum time interval for the power source, respectively.

12. The fuel injection control method according to claim 11, wherein:
    said modification means includes means for adjusting $TyS'$ to $$Tys'=Tys-(TyE+Tm-TxS)$$

if it is concluded that $TyE+Tm>TxS$ holds, where $Tys'$ is a new shifted threshold voltage impression beginning for the succeeding cylinder.

13. The fuel injection control method according to claim 10, wherein:
    said coincidence determination means includes means for determining whether or not $$TxE+Tm>TyS$$

holds if it is concluded that $TyS \leq TxS$ does not hold, where $TyE$ is the threshold voltage impression end for the succeeding cylinder.

14. The fuel injection control method according to claim 13, wherein:
    said modification means includes means for adjusting $TyS''$ to $$TyS''=TxE+Tm$$

if it is concluded that $TxE+Tm>TyS$ holds, where $TyS''$ is a new shifted threshold voltage impression beginning for the succeeding cylinder.

* * * * *